US009527198B2

(12) United States Patent
Moore

(10) Patent No.: US 9,527,198 B2
(45) Date of Patent: Dec. 27, 2016

(54) SURGE ACCUMULATOR FOR HYDRAULIC HAMMER

(71) Applicant: Caterpillar Inc., Peoria, IL (US)

(72) Inventor: Cody Moore, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 456 days.

(21) Appl. No.: 13/928,589

(22) Filed: Jun. 27, 2013

(65) Prior Publication Data

US 2015/0000949 A1 Jan. 1, 2015

(51) Int. Cl.

| | |
|---|---|
| ***F16L 55/04*** | (2006.01) |
| ***B25D 9/14*** | (2006.01) |
| ***F15B 1/12*** | (2006.01) |
| ***F15B 1/10*** | (2006.01) |
| ***B25D 9/12*** | (2006.01) |

(52) U.S. Cl.

CPC ................ *B25D 9/145* (2013.01); *B25D 9/12* (2013.01); *F15B 1/106* (2013.01); *F15B 1/12* (2013.01); *B25D 2209/002* (2013.01); *F15B 2201/205* (2013.01); *F15B 2201/3151* (2013.01); *F15B 2201/405* (2013.01); *F15B 2201/41* (2013.01); *F15B 2201/43* (2013.01)

(58) Field of Classification Search

CPC .......... F16L 55/04; F16L 55/05; F16L 55/053; F15B 1/12; F15B 2201/205; F15B 2201/3151

USPC ...................................................... 138/26, 30

See application file for complete search history.

(56) References Cited

U.S. PATENT DOCUMENTS 3,948,288 A * 4/1976 Mayer ........................ F15B 1/18 138/30
4,474,215 A * 10/1984 Richter ................... F15B 1/125 138/30
4,676,323 A * 6/1987 Henriksson .............. B25D 9/12 138/30
5,797,430 A * 8/1998 Becke ................. F04B 11/0016 138/26
5,944,120 A 8/1999 Barden
6,079,450 A * 6/2000 Onishi ................... F02M 55/04 138/26
6,155,301 A 12/2000 Ohji
7,478,648 B2 * 1/2009 Lundgren .............. B25D 9/145 138/30

(Continued)

FOREIGN PATENT DOCUMENTS

GB 1576566 10/1980
GB 2141657 1/1985

*Primary Examiner* — Patrick F Brinson

(74) *Attorney, Agent, or Firm* — Miller, Matthias & Hull LLP

(57) ABSTRACT

A hydraulic hammer is disclosed that includes at least one accumulator that is connectable to a hydraulic circuit disposed in the housing of the hammer. The accumulator includes an annular base coupled to a cover with a diaphragm sandwiched therebetween. The annular base includes a proximal end and a distal end. The proximal end of the annular base defines a first central opening. The proximal end of the base in the housing define an annular inlet that encircles the first central opening and that is in communication with the first central opening. The cover also includes a proximal end and a distal end. The proximal end of the cover is coupled to the distal end of the base with the outer periphery of the diaphragm sandwiched therebetween.

20 Claims, 4 Drawing Sheets

(56) References Cited

U.S. PATENT DOCUMENTS

| | | | | |
|---|---|---|---|---|
| 8,291,937 | B2 * | 10/2012 | Sjodin | B25D 99/145<br>138/26 |
| 2005/0139277 | A1 * | 6/2005 | Baltes | F15B 1/12<br>138/30 |
| 2009/0229844 | A1 | 9/2009 | Pillers, II | |
| 2013/0081837 | A1 | 4/2013 | Jagdale | |
| 2014/0020920 | A1 * | 1/2014 | Tang | B25D 9/145<br>173/90 |

* cited by examiner

SURGE ACCUMULATOR FOR HYDRAULIC HAMMER

TECHNICAL FIELD

This disclosure relates generally to a hydraulic or pneumatic tool assembly, and more specifically to a hammer having a surge accumulator having a cover mated to a base with a diaphragm sandwiched therebetween.

BACKGROUND

Hydraulic hammers are used on work sites to break up large, hard objects before the objects can be moved away. Hydraulic hammers may be mounted to machines including, but not limited to backhoes, excavators, tractors, skid steer loaders or other machines, as will be apparent to those skilled in the art. Hydraulic hammers may also be hand-held. Typically, the hammer is powered by a hydraulic pressure source although pneumatic pressure sources are known. A typical hydraulic hammer includes a pressurized liquid circuit that is in communication with a reciprocating piston that may engage a tool or bit that engages the work surface. More specifically, during a work or power stroke, high pressure liquid is applied to at least one shoulder of the piston that is disposed within a cylinder. Pressure on the shoulder drives the piston in a downward or forward direction. The piston then strikes the bit, which is driven in the downward or forward direction thereby causing the bit to strike the work surface (e.g., the rock, concrete, asphalt or other hard object to be broken up). During a return stroke, liquid pressure is applied to at least one other shoulder of the piston in order to return or retract the piston and the bit back to their original positions.

In addition to a liquid circuit that drives the hammer as discussed above, hydraulic hammers may also include a gas circuit for absorbing, reducing or minimizing vibrations and noise from the liquid circuit. Hydraulic hammers may also include an accumulator that couples the liquid circuit to the gas circuit. Specifically, the vibration/noise in the liquid circuit may be caused by pressure variations in the liquid circuit. Such pressure variations in the liquid circuit may be caused by pressure pulsations or pulsating flow of the liquid in the liquid circuit. An accumulator for a hydraulic hammer may typically include a base and a cover that form a vessel. The vessel may be divided by a deformable partition member, such as a diaphragm. The diaphragm divides the vessel into a gas chamber that is in communication with the gas circuit and a liquid chamber that is in communication with the liquid circuit. The term diaphragm, as used herein, is intended to encompass any flexible barrier, partition, wall or member that can divide a vessel, such as an accumulator, into two isolated chambers as described above. The gas chamber is typically filled with nitrogen or another gas, which is pressurized. In response to a pressure increase in the liquid circuit, liquid may be discharged from the liquid circuit to the liquid chamber, thereby causing the diaphragm to be biased towards the gas chamber. Conversely, in response to a pressure decrease in the liquid circuit, liquid may be discharged from the liquid chamber to the liquid circuit, thereby causing the diaphragm to be biased towards the liquid chamber. Accumulators are designed to effectively absorb or accommodate the pulsating flow of the liquid in the circuit and consequently reduce or alleviate vibrations and noises caused by the pulsating flow.

However, current accumulators typically include a base that must allow liquid to pass through the base freely, but which also must be rigid. The base must not have large holes or gaps; otherwise the diaphragm could be extruded or damaged by the base if the diaphragm is pressed against the large holes or gaps with significant pressure. Currently, typical accumulator bases have large amounts of small holes or perforations, sometimes in excess of 1000. A base of this type is expensive to manufacture, in part because of the many holes and the need to deburr and clean the holes after they are formed in the base.

Accordingly, accumulator designs with improved base structures are needed that both effectively reduce vibration and noise caused by pulsating flow in a pressurized liquid circuit and which are inexpensive and easy to manufacture.

SUMMARY

In one aspect, an accumulator is disclosed that may couple a liquid or hydraulic circuit of a hydraulic hammer to a gas circuit of the hammer. The disclosed accumulator may include an annular base that may include a proximal end and a distal end. The proximal end of the base may define a first central opening. The proximal end of the base and the housing may also define an annular inlet that encircles the first central opening and that is in communication with the first central opening. The accumulator may also include a diaphragm that may have an outer periphery and a cover that may include a proximal end and a distal end. The proximal end of the cover may be coupled to the distal end of the base with the outer periphery of the diaphragm sandwiched therebetween.

In another aspect, a hydraulic circuit is disclosed that may include a housing that, in turn, may include an input passageway and an output passageway. The hydraulic circuit may further include an accumulator that may include an annular base having a proximal end and a distal end. The proximal end of the base may engage the housing so that the proximal end of the base and the housing may define an annular inlet. The annular inlet may provide communication between the input passageway and the first central opening and between the first central opening and the output passageway. The accumulator may also include a diaphragm that may have an outer periphery and the accumulator may also include a cover. The cover may include a proximal end and a distal end. The proximal end of the cover may be coupled to the distal end of the base with the outer periphery of the diaphragm being sandwiched therebetween.

In yet another aspect, a hydraulic hammer is disclosed. The disclosed hydraulic hammer may include a housing that may define at least part of a hydraulic circuit that may include an input passageway and an output passageway. The hydraulic hammer may further include an accumulator. The accumulator may include an annular base that may include a proximal end and a distal end. The proximal end of the base may define a first central opening. The proximal end of the base may be received in a recess disposed in the housing so that the proximal end of the base and the recess in the housing may define an annular inlet. The annular inlet may provide communication between the input passageway and the first central opening and between the first central opening and the output passageway. The accumulator may further include a diaphragm that may include an outer periphery. The accumulator may also include a cover having a proximal end and a distal end. The proximal end of the cover may be coupled to the distal end of the base with the outer periphery of the diaphragm sandwiched therebetween. The cover may also be coupled to the housing with the base sandwiched between the cover and the housing. And, the input and output passageways may be in communication with a piston for extending and retracting the piston.

DESCRIPTION

Figure 1:
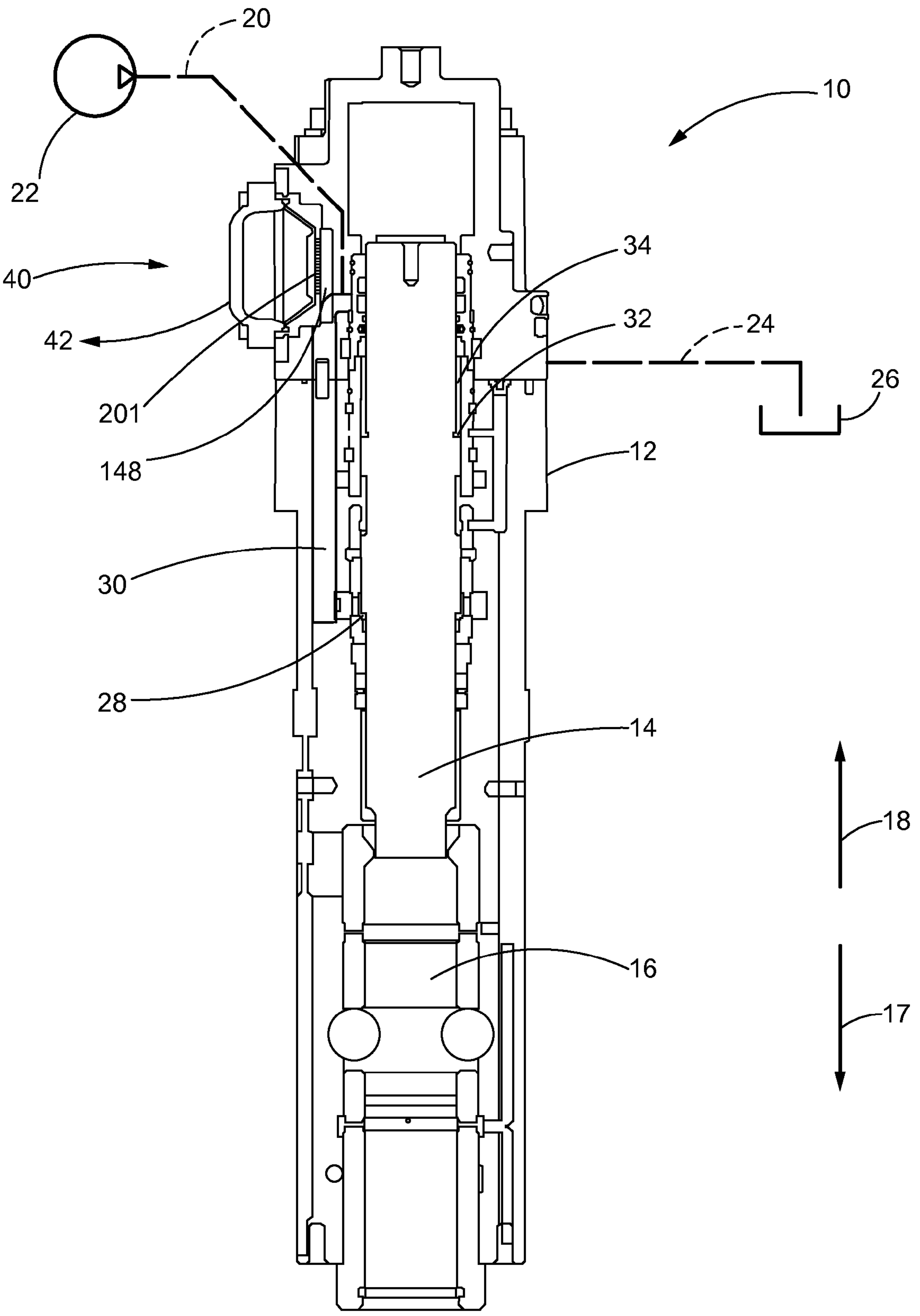
FIG. 1 is a sectional view of a hammer according to the present disclosure.

This disclosure relates to improved surge accumulators for reducing noise and vibration in the hydraulic circuits and hydraulic circuits equipped with surge accumulators that may be part of a hammer. The hammer may be associated with a machine, such as an excavator, backhoe, tractor, skid steer loader or other machine as will be apparent to those skilled in the art. The hammer may also be hand-held. The hammer may be powered hydraulically. An exemplary hammer 10 is shown in FIG. 1. One skilled in the art will recognize that the disclosed accumulator 40 of FIG. 1 may be incorporated into hydraulic hammers of numerous designs and, hence, this disclosure is not limited to the specific hammer 10 disclosed herein. For example, the accumulator 40 may be used in any application involving a hydraulic or liquid system that is subject to pressure.

FIG. 1 provides a cross-sectional view of the exemplary hammer 10. As shown in FIG. 1, the hammer 10 may include a housing 12 within which a piston 14 may be slidably supported. Additionally, a work tool 16 may be supported in a lower end of the housing 12 with a portion of the work tool 16 extending outward therefrom as shown in FIG. 1. The work tool 16 may have any configuration, e.g., a chisel, that would be useful in hammering application. The work tool 16 also may be configured so as to be removable so as to allow a variety of tools with different configurations to be attached to the hammer 10.

The piston 14 may be supported so as to be movable relative to the housing 12 in a reciprocating manner generally in the direction of arrows 17 and 18 in FIG. 1. More specifically, during an impact or work stroke, the piston 14 moves in the general direction of arrow 17 and near the end of the work stroke comes into contact with the work tool 16 such as shown in FIG. 1. Conversely, during a return stroke, the piston 14 retracts away from contact with the work tool 16 (the position shown in FIG. 1) in the general direction of arrow 18. The reciprocating impacts of the piston 14 on the work tool 16, in turn, drive a corresponding reciprocating movement of the work tool 16. When the piston 14 strikes the work tool 16, the force of the piston 14 is transmitted to the work tool 16 in the general direction of arrow 17. This force may be applied to a hard object such as rock, concrete or asphalt in order to break up the hard object.

The reciprocating movement of the piston 14 may be driven, at least in part, by an incompressible liquid, such as pressurized hydraulic liquid (hereinafter "liquid"). To this end, the hammer 10 may include a high pressure inlet 20 which is coupled to or in communication with a high pressure source, such as a hydraulic pump 22, and an outlet 24 which is coupled to or in communication with a low pressure source, such as a reservoir or tank 26. The pump 22 and tank 26 may be provided as part of a machine (i.e., backhoe, tractor, excavator, loader, etc.) to which it is attached.

In order to retract the piston 14 upward in the direction of the arrow 18, the piston 14 may include an upward liquid engagement surface 28 that may be exposed to liquid pressure in a first liquid chamber 30 that is defined in the housing 12. The upward engagement surface 28 may be in the form of an annular shoulder provided in the surface of the piston 14 and may be configured or oriented for moving the piston 14 in the direction of arrow 18 away from the work tool 16. In order to move the piston 14 downward towards the work tool 16 (i.e., in the direction of arrow 17), the piston 14 may further include a downward liquid engagement surface 32 that may be exposed to liquid pressure in a second liquid chamber 34. In this case, the downward liquid engagement surface 32 is arranged above the upward liquid engagement surface 28 on the piston 14 and also is in the form of an annular shoulder in the surface of the piston 14. The downward liquid engagement surface 32 may be configured with a larger effective surface area than the upward liquid engagement surface 28 such that the piston 14 is driven downward in the general direction of arrow 17 when both the first and second liquid chambers 30, 34 are in communication with the high pressure inlet 20. When only the first liquid chamber 30 is in communication with the high pressure inlet 28, high pressure liquid only acts on the upward engagement surface 28 and the piston 14 is driven upward. A control valve assembly (not shown) may be provided that selectively connects the second liquid chamber 34 with either the high pressure inlet 20 or the low pressure outlet 24. The control valve assembly may be configured such that movement of the piston 14 switches the control valve assembly between connecting the second liquid chamber 34 with the high pressure inlet 20 and the low pressure outlet 24. Those skilled in the art will appreciate that the present disclosure is not limited to any particular pressurized fluid system and that any suitable arrangement capable of driving upward and downward reciprocating movement of the piston may be used.

Figure 2:
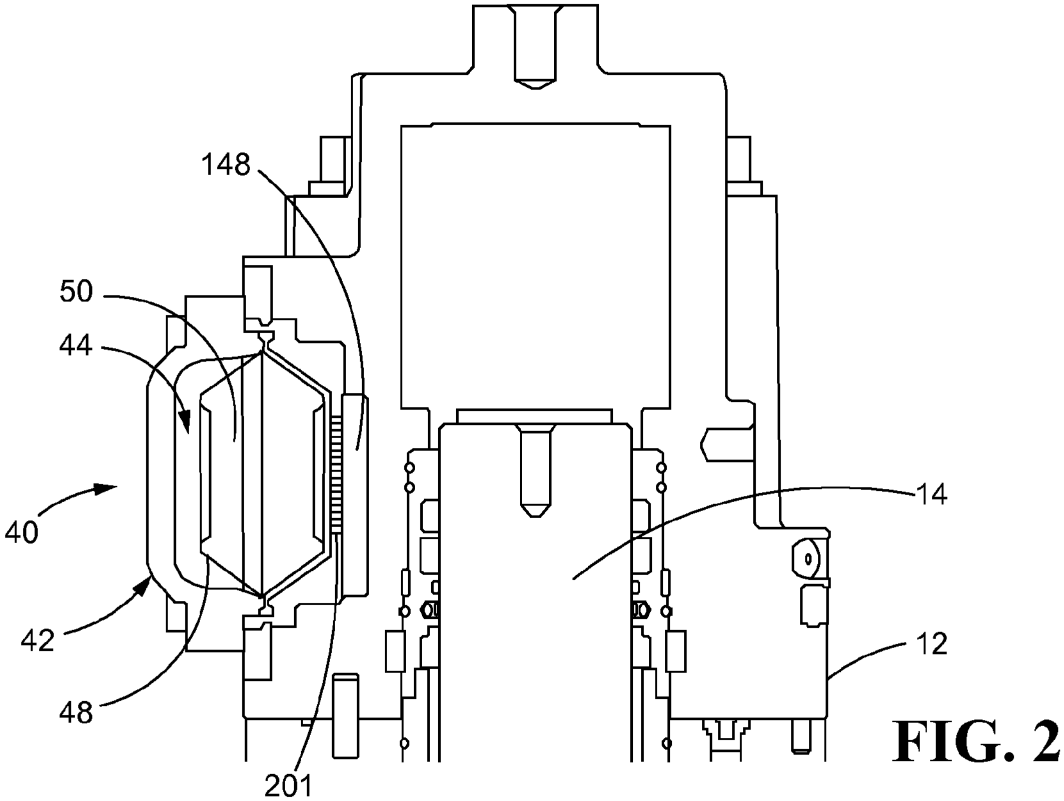
FIG. 2 is a partial, enlarged sectional view of the hammer of FIG. 1 showing the accumulator with the movable diaphragm positioned so as to define a relatively larger volume for receiving pressurized liquid as compared to the position shown in FIG. 3.
Figure 3:
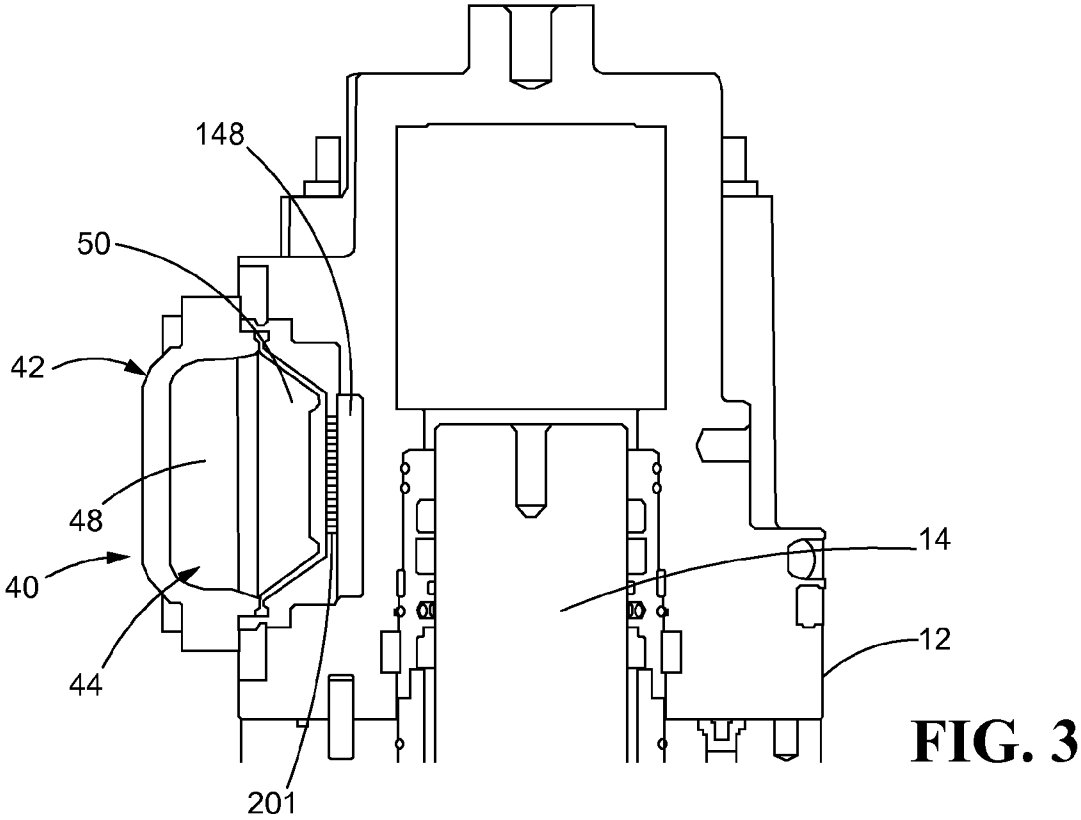
FIG. 3 is a partial, enlarged, sectional view of the hammer of FIGS. 1 and 2 showing the accumulator with the movable diaphragm positioned so as to define a relatively smaller volume for receiving pressurized gas as compared to the position shown in FIG. 2.

A variable volume accumulator 40 may be provided. The accumulator 40 may include a housing 42 that defines an interior space 44 which may be divided by a diaphragm 46 into a gas chamber 48 containing a compressible gas and a liquid chamber 50 that may receive a pressurized and incompressible liquid, such as hydraulic fluid from the pump 22. The accumulator 40 may be arranged and configured such that the gas chamber 48 of the accumulator 40 is in communication with the gas chamber 38. For example, as shown in FIGS. 1-3, the accumulator 40 may be arranged on a side of the housing 12 of the hammer 10 and with the gas chamber 48 of the accumulator 40 in communication with the gas chamber 38 via a passageway 52. While FIGS. 1-3 show the accumulator 40 mounted remotely from the gas chamber 38, the accumulator 40 could be mounted directly to or integrated with the gas chamber 38 such that the accumulator 40 and gas chamber 38 share the same housing. Hence, the accumulator 40 could be mounted to the side of the housing 12 as shown in FIGS. 1-3 or to the top of the housing 12.

To allow the volume of the gas chamber 48 of the accumulator 40 to be selectively varied, the diaphragm 46 dividing the interior space 44 may be movable. For example, the diaphragm 46 may be configured to move in response to changing the amount of pressurized liquid in the liquid chamber 50 of the accumulator 40. As more pressurized liquid is added to the liquid chamber 50, the diaphragm 46 will move towards the gas chamber 48 to accommodate the additional liquid in the liquid chamber 50, thereby shrinking the volume of the gas chamber 48. Likewise, removing pressurized liquid from the liquid chamber 50 will cause the diaphragm 46 to move towards the liquid chamber 50 thereby expanding the volume of the gas chamber 48. The diaphragm 46 may be made of an elastically deformable material, such as a rubber or polymer membrane or the like. Various types of diaphragms 46 can be used to separate the interior space 44 into two chambers 48, 50, as will be apparent to those skilled in the art.

In FIG. 2, the liquid chamber 50 has experienced a decrease in pressure and, consequently, the diaphragm 46 has moved towards the liquid chamber 50 thereby expanding the gas chamber 48. In this position, the pressure decrease in the liquid chamber 50 causes the gas chamber 48 to expand and consume most of the interior space 44 of the accumulator 40. In contrast, in FIG. 3, the liquid chamber 50 has experienced an increase in pressure, causing the diaphragm 46 to move towards the gas chamber 48 thereby maximizing the liquid chamber 50 and minimizing the gas chamber 48. In the position shown in FIG. 3, the liquid chamber 50 consumes all or nearly all of the interior space 44 of the accumulator 40 such that the accumulator provides very little to no space for receiving pressurized gas from the gas chamber 38.

Because the gas chamber 48 of the accumulator 40 is in communication with the interior of the gas chamber 38 of the housing 12, moving the diaphragm 46 towards the gas chamber 48 to reduce the volume of the gas chamber 48 (as shown in FIG. 3) also reduces the effective volume available for the gas contained in the gas chamber 38. Reducing the volume of the gas chamber 48 of the accumulator 40 increases the pressure of the gas in the gas chamber 38. Increasing the pressure of the gas in the gas chamber 38, in turn, increases the biasing force on the piston 14 that is generated by compressed gas in the gas chamber 38 as the piston 14 is retracted towards the gas chamber 38 during the upward return stroke of the piston 14. The result is an increased downward force on the piston 14 during a subsequent work stroke and an increased impact force on the work tool 16.

Similarly, moving the diaphragm 46 towards the liquid chamber 50 to increase the size of the gas chamber 48 (such as shown in FIG. 2) provides additional volume for the gas, causing it to expand, resulting in lower gas pressure and, in turn, a smaller downward biasing force on the piston 14. Comparing FIGS. 2 and 3, the position of the diaphragm 46 shown in FIG. 3 would produce a relatively larger downward biasing force on the piston 14 than the position of the diaphragm 46 shown in FIG. 2. Thus, the impact force on the work tool 16 can be selectively varied by moving the diaphragm 46 within the accumulator 40.

Figure 4:
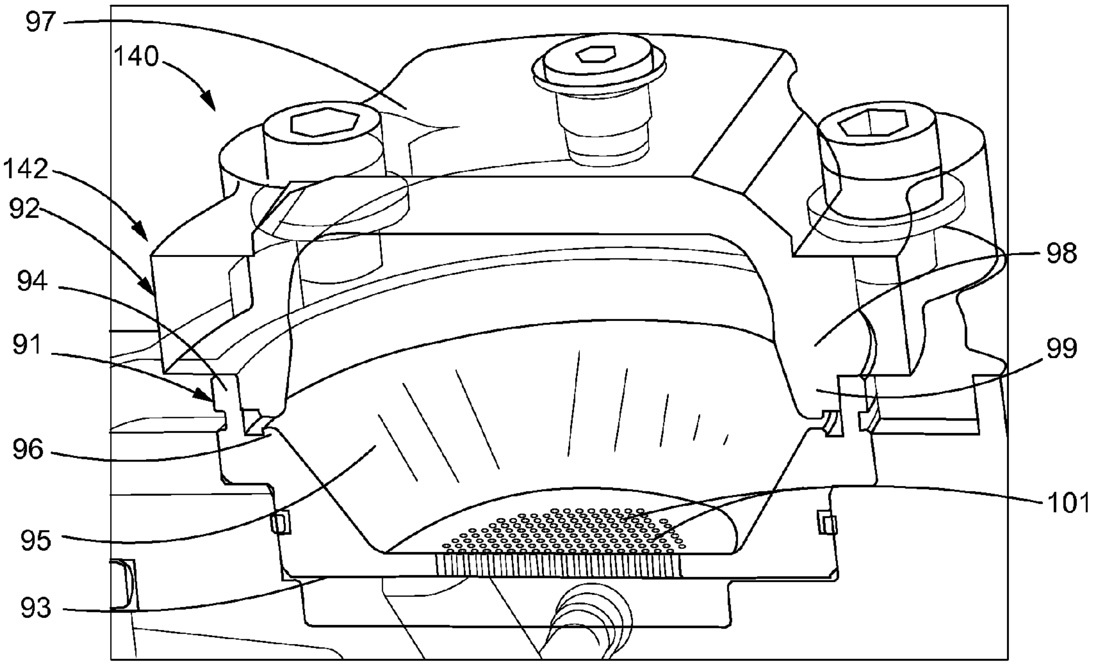
FIG. 4 (Prior Art)
FIG. 4 is a partial sectional view of a prior art surge accumulator with the diaphragm removed thereby illustrated in base with a plurality of small holes or perforations.
Figure 5:
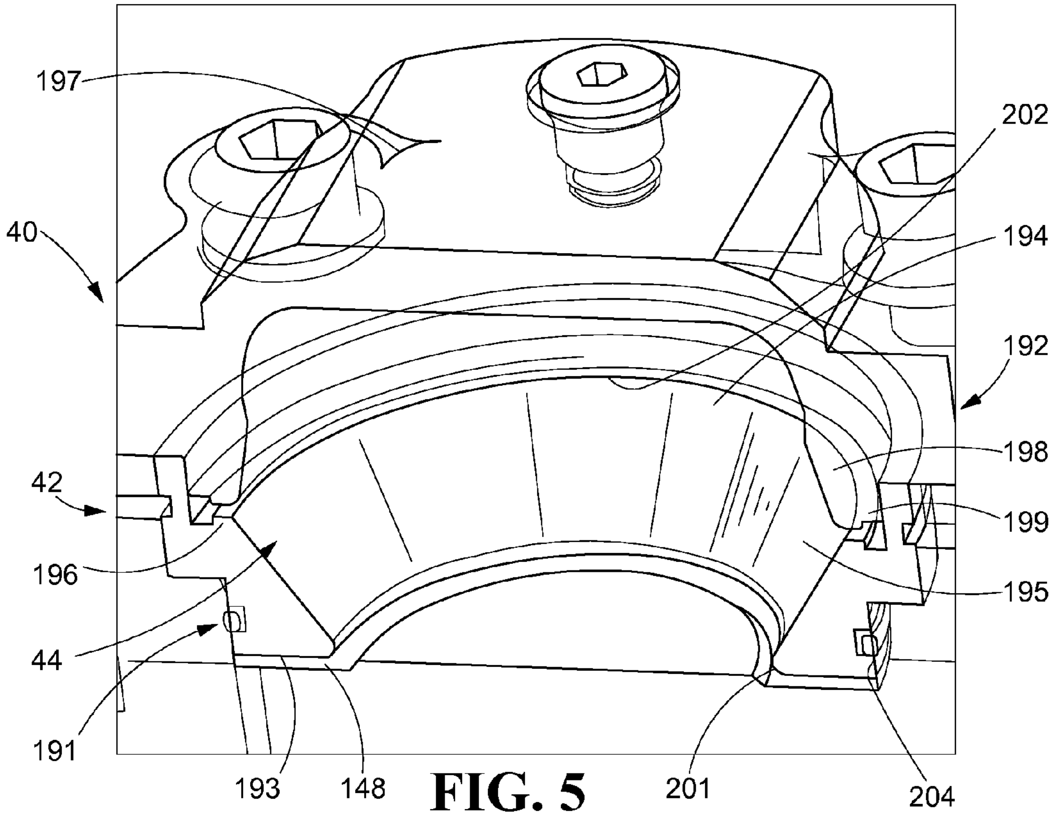
FIG. 5 is a partial perspective view of a disclosed surge accumulator, with the diaphragm removed thereby illustrating the annular inlet that is in communication with the central opening disposed in the proximal end of the base.
Figure 6:
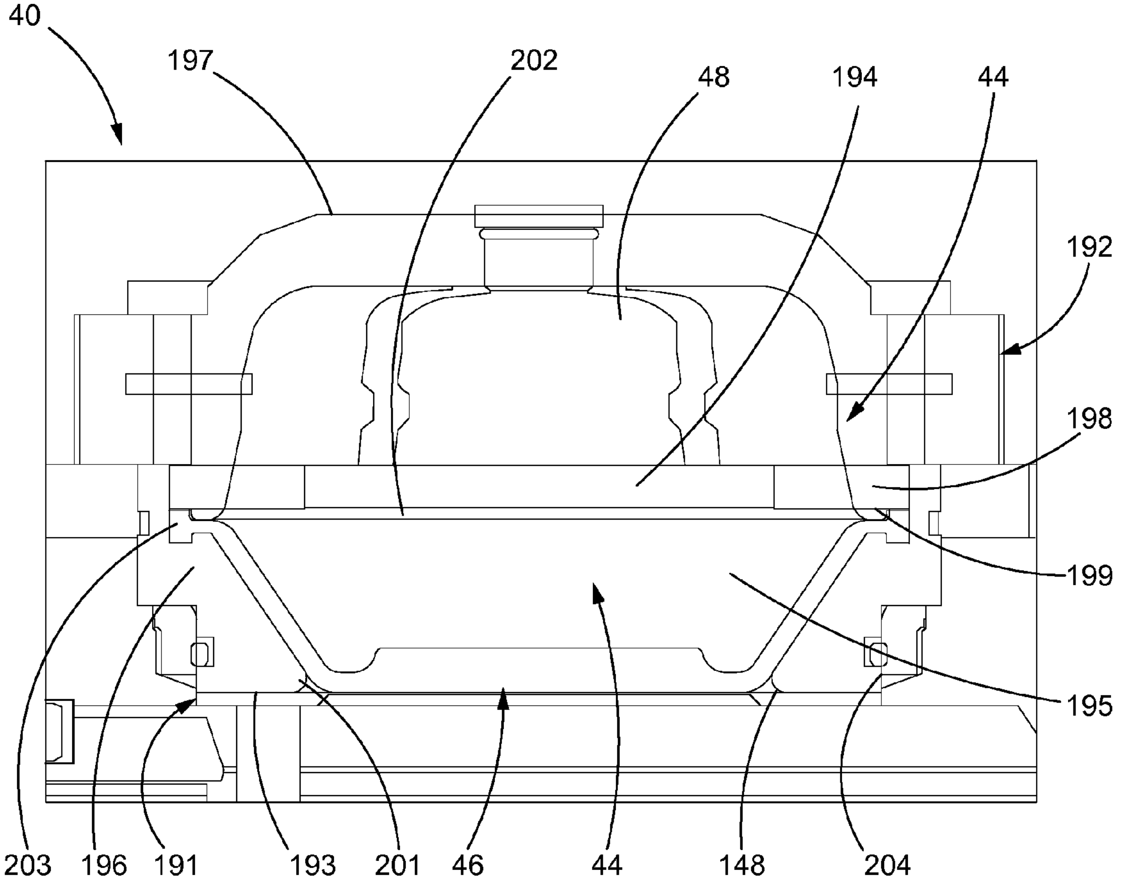
FIG. 6 is a front sectional view of the accumulator shown in FIG. 4, illustrating the position of the outer periphery of the diaphragm between the distal end of the base and the proximal end of the cover.

Details of the construction of the accumulator 40 are provided in FIGS. 5-6. However, prior to turning to FIGS. 5-6, a prior art accumulator 140 is illustrated in FIG. 4. The accumulator 140 includes a base 91 that is mated to a cover 92. Although not shown in FIG. 3, a diaphragm is sandwiched between the base 91 and the cover 92. The base 91 includes a proximal end 93 and a distal end 94. The base also includes a slanted wall 95 and a first annular projection 96. Similarly, the cover 92 includes a distal end 97 and a proximal end 98. The proximal end 98 of the cover 92 includes a second annular projection 99. An outer periphery of a diaphragm (not shown) is sandwiched between the first and second annular projections 96, 99 respectively.

The proximal end 93 of the base 91 includes a plurality of through holes 101, or perforations. The base 91 as illustrated in FIG. 4 is difficult to manufacture because of the many through holes, openings or perforations 101. The accumulator base 91 must allow hydraulic liquid to pass freely and the base 91, but the base 91 must also be rigid and the holes 101 must be small. Any large holes or gaps in the base 91 could cause the polymeric diaphragm to be extruded by large holes or openings. Hence, the grid of small holes or perforations 101 as shown in FIG. 4 is a conventional design that avoids extrusion or damaging of the diaphragm. Some bases 91 of accumulators 142 may include as many as 1,000 or more holes 101. Thus, the base 91 as shown in FIG. 4 can be very expensive to manufacture. Adding to this expense is the need to deburr and/or clean the proximal end 93 of the base 91 as any fragments or burrs could damage the diaphragm 46 (see FIG. 6).

Turning to FIGS. 5-6, a disclosed accumulator 40 is shown in greater detail. The accumulator 40 also includes a base 191 coupled to a cover 192. The base 191 includes a proximal end 193 and a distal end 194. The base 191 is annular in configuration and includes a first central opening 201 at the proximal end 193 of the base 191 and a second central opening 202 at the distal end 194 or, the central openings 201, 202 are separated by the slanted wall 195. The base 191 may also include a first annular protrusion 196. The cover 192 may include a distal end 197, a proximal end 198 and a second annular protrusion 199. The annular protrusions 196, 199 may be directed toward each other and for sandwiching an outer periphery 203 of the diaphragm 46 between the annular protrusions 196, 199 as illustrated in FIG. 6.

As also illustrated in FIGS. 2-3 and 6, the base 191 may be received within a recess 204 disposed within the housing 12. The proximal end 193 of the base 191 and the recess 204 in the housing 12 may define an annular inlet 148. The annular inlet 148 may be in communication with the passage 52 as shown in FIGS. 2-3 and may provide communication between the passage 52 and the gas chamber 48 (see FIGS. 2-3). By providing the annular inlet 148 between the proximal end 193 of the base 191 and the housing 12, the same amount of gas is able to pass through the annular inlet 148 of as the plurality of holes shown in FIG. 4, but the annular base 191 shown in FIGS. 5-6 is easier and cheaper to manufacture than the conventional base 91 shown in FIG. 4. Further, because of the reduction in machine costs, the base 191 can be fabricated from tubing instead of a solid bar stock as a raw material. Thus, a hammer 10, a machine equipped with a hammer 11, an accumulator 40 and a base 191 for an accumulator 40 are all disclosed that are cheaper and easier to manufacture because of the annular structure of the base 191 as shown in FIGS. 2-3 and 5-6.

INDUSTRIAL APPLICABILITY

The variable volume accumulator 40 described herein may be implemented in hydraulic hammers. While the variable volume accumulator assembly 40 is described in connection with an exemplary hammer assembly 10, it also could be implemented in other contexts. In particular, the variable volume accumulator assembly of the present disclosure could be used in any application involving a pressurized fluid system with which it would be desirable to use an accumulator that could absorb a variable volume of pressurized fluid.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An accumulator that is connectable to a hydraulic circuit disposed in a housing, the accumulator comprising:
- an annular base including a proximal end and a distal end, the proximal end of the base defining a first central opening, the proximal end of the base and the housing defining an annular inlet that encircles the first central opening and that is in communication with the first central opening;
- a diaphragm having an outer periphery;
- a cover including a proximal end and a distal end, the proximal end of the cover coupled to the distal end of the base with the outer periphery of the diaphragm sandwiched therebetween.

2. The accumulator of claim 1 wherein the distal end of the base includes a first annular projection, the proximal end of the cover includes a second annular projection, the first and second annular projections being directed at one another and sandwiching the outer periphery of the diaphragm therebetween.

3. The accumulator of claim 1 wherein the cover is connected to the housing with by at least one fastener and the base is sandwiched between the cover and the housing.

4. The accumulator of claim 1 wherein the distal end of the cover includes a gas inlet port for receiving pressurized liquid.

5. The accumulator of claim 1 wherein the base defines a first liquid chamber disposed between the proximal end of the base and the diaphragm.

6. The accumulator of claim 1 wherein the cover defines a second liquid chamber disposed between the diaphragm and the distal end of the cover.

7. The accumulator of claim 1 wherein the proximal end of the base is free of perforations or openings other than the first central opening.

8. The accumulator of claim 1 wherein the proximal end of the base is received within a recess disposed in the housing, the recess and the proximal end of the base defining the annular inlet.

9. The accumulator of claim 1 wherein the base includes an inner wall that extends radially outwardly as it extends from the first central opening to a second central opening that is defined by the distal end of the base.

10. The accumulator of claim 2 wherein the base includes a frusto-conically shaped inner wall that extends radially outwardly as it extends from the first central opening to the first annular projection.

11. The accumulator of claim 1 wherein the annular inlet extends radially inwardly from outside the first central opening before being connected to the first central opening.

12. A hydraulic circuit comprising:
- a housing including an input passageway and an output passageway;
- an accumulator including an annular base including a proximal end and a distal end, the proximal end of the base defining a first central opening, the distal end of the base defining a second central opening, the proximal end of the base engaging the housing, the proximal end of the base and the housing defining an annular inlet, the annular inlet providing communication between the input passageway and the first central opening and between the first central opening and the output passageway, a diaphragm including an outer periphery, a cover including a proximal end and a distal end, the proximal end of the cover coupled to the distal end of the base with the outer periphery of the diaphragm being sandwiched therebetween.

13. The hydraulic circuit of claim 12 wherein the distal end of the base includes a first annular projection, the proximal end of the cover includes a second annular projection, the first and second annular projections being directed at one another and sandwiching the outer periphery of the diaphragm therebetween.

14. The hydraulic circuit of claim 12 wherein the cover is connected to the housing with by at least one fastener and the base is sandwiched between the cover and the housing.

15. The hydraulic circuit of claim 12 wherein the distal end of the cover includes a gas inlet port for receiving pressurized gas.

16. The hydraulic circuit of claim 12 wherein the base defines a first liquid chamber disposed between the proximal end of the base and the diaphragm and wherein the cover defines a second liquid chamber disposed between the diaphragm and the distal end of the cover.

17. The hydraulic circuit of claim 12 wherein the proximal end of the base is free of perforations or openings other than the first central opening.

18. The hydraulic circuit of claim 12 wherein the proximal end of the base is received within a recess disposed in the housing, the recess and the proximal end of the base defining the annular inlet.

19. The hydraulic circuit of claim 12 wherein the base includes a frustoconical inner wall that extends radially outwardly as it extends from the first central opening to the second central opening.

20. A hydraulic hammer comprising:

a housing defining at least part of a hydraulic circuit including an input passageway and an output passageway;

an accumulator including an annular base including a proximal end and a distal end, the proximal end of the base defining a first central opening, the proximal end of the base being received in a recess in the housing, the proximal end of the base and the recess in housing defining an annular inlet, the annular inlet providing communication between the input passageway and the first central opening and between the first central opening and the output passageway, the accumulator further including a diaphragm including an outer periphery, the accumulator further including a cover including a proximal end and a distal end, the proximal end of the cover being coupled to the distal end of the base with the outer periphery of the diaphragm sandwiched therebetween, the cover being coupled to the housing with the base sandwiched between the cover and the housing, the base and diaphragm defining a first liquid chamber disposed between the proximal end of the base and the diaphragm, the first liquid chamber being in communication with the input and output passageways, and the cover and diaphragm defining a second liquid chamber disposed between the diaphragm and the distal end of the cover; and the input and output passageways being in communication with a piston for extending and retracting the piston.

* * * * *